United States Patent [19]
Rimpi

[11] Patent Number: 4,799,994
[45] Date of Patent: Jan. 24, 1989

[54] PROCESS FOR COOKING AND BLEACHING PULP

[75] Inventor: Pertti Rimpi, Tampere, Finland

[73] Assignee: Oy Tampella AB, Tampere, Finland

[21] Appl. No.: 856,416

[22] Filed: Apr. 28, 1986

[30] Foreign Application Priority Data

Apr. 29, 1985 [FI] Finland .................................. 851703

[51] Int. Cl.⁴ .......................................... D21C 11/00
[52] U.S. Cl. .................... 162/29; 162/30.1; 162/30.11; 162/31; 162/33; 162/51; 423/240; 423/DIG. 3
[58] Field of Search ............... 162/31, 29, 30.1, 30.11, 162/33, 51; 423/240, DIG. 3; 55/71

[56] References Cited

U.S. PATENT DOCUMENTS

| | | |
|---|---|---|
| 3,909,344 | 9/1975 | Lukes .................................. 162/17 |
| 4,244,779 | 1/1981 | Nieminen et al. .................... 162/30.1 |
| 4,288,286 | 9/1981 | Fuller ................................. 162/30.1 |
| 4,329,199 | 5/1982 | Andersson et al. ............... 162/51 X |

Primary Examiner—Peter Chin
Assistant Examiner—Thi Dang
Attorney, Agent, or Firm—Roylance, Abrams, Berdo & Goodman

[57] ABSTRACT

A process for cooking and bleaching pulp in a closed system, wherein spent liquors from the cooking and the bleaching are recovered and their chemicals are regenerated and recycled as cooking and bleaching chemicals.

10 Claims, 1 Drawing Sheet

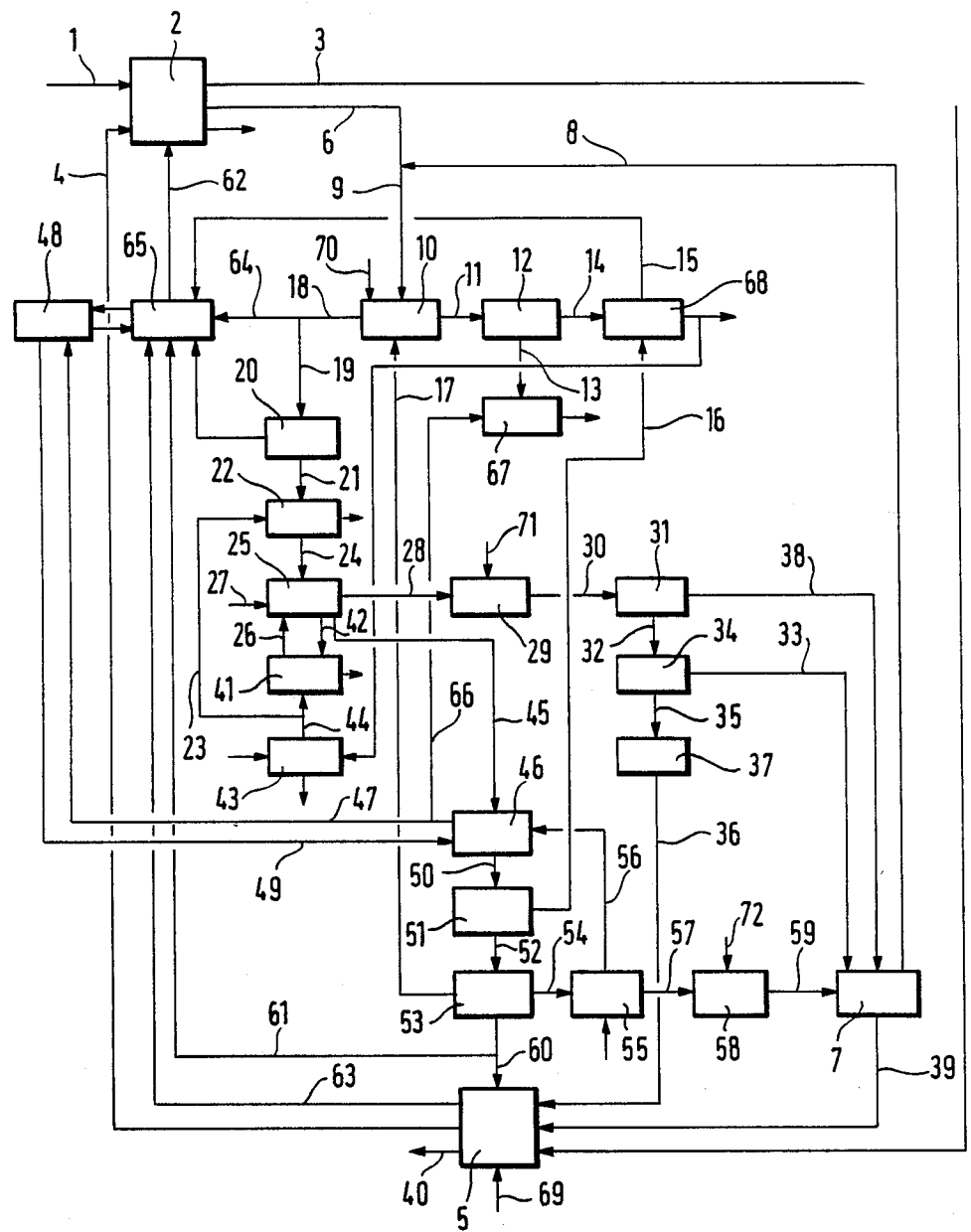

PROCESS FOR COOKING AND BLEACHING PULP

This invention relates to a process for cooking and bleaching pulp, in which the spent liquors from the cooking and the bleaching are recovered and their chemicals are regenerated in order to be recycled as cooking and bleaching chemicals.

The problems caused by organic chlorine compounds in bleaching have been present for a long time, and by measures taken in different sections the amount of organic chlorine compounds has actually been reduced. Such measures consist among others of the increased use of $ClO_2$ and $O_2$ as bleaching chemicals instead of chlorine. The need for active chlorine in the bleaching has also been reduced by continuing the cooking. In addition, one has tried to entirely avoid the use of chlorine bleaching chemicals, at least $ClO_2$ bleaching chemical is however likely to be needed in the future in order to achieve a satisfactory bleaching result.

It may be generally stated, that existing plants, which produce bleached sulphate pulp, even in the optimal case recover organic chlorine compounds generated in the bleaching unsatisfactorily with regard to environment protection.

This depends on the shortcomings and the complexity of appropriate processes, caused primarily by the chlorine compounds used in the bleaching, their preparation and the special requirements made on chlorine material selections.

A number of processes are known for passing the spent liquor from the bleaching into the cooking chemical cycle. In such closed circuits the Cl concentration tends to rise, causing e.g. corrosion of the devices, if the Cl compounds are not separated from the cycle.

The removal of sodium chloride from closed sulphate pulp processes has been described inter alia in the U.S. patent specifications Nos. 3,698,995, 3,746,612 and 3,909,344. The efficiency of these processes is however restricted, since they require much vapour for evaporation and high investment costs.

In addition, the ZA-patent specification No. 83/7742 (corresponding to the FI application No. 67732) discloses a process, by which the Cl concentration of the chemical cycle may be reduced by separating sodium chloride from the green liquor. The disclosed method permits the separation of sodium chloride from green liquor with a high separation degree of chloride, the separation of chloride having been preceded by the separation of sulphide in the form of hydrogen sulphide. The proposed method still has the disavantage of reabsorbing ultimately the separated hydrogen sulphide into the sodium or hydroxy solution, which produces a need for additional causticizing.

The present invention then has the purpose of achieving a more efficient process of recovering chemicals from the spent liquor of pulp cooking and bleaching and most particularly from such green liquor, which has been obtained by burning the black liquor deriving from the sulphate cooking and the chlorine bleaching solution, and of regenerating these chemicals in order to make them appropriate for recycling as cooking and bleaching chemicals.

The process according to the invention permits a high separation of sodium chloride from green liquor to a level corresponding to ZA-No. 83/7742, but without reabsorbing the separated hydrogen sulphide into the process, which reduces the need for causticizing and diminishes the devices as well as makes the separation of sodium chloride less complicated.

When preparing bleached pulp in accordance with the process of the invention, besides recovering entirely the spent liquor from the cooking and the bleaching, their chemicals may also be regenerated in order to be recycled as cooking and bleaching chemicals, without bringing about a need for removing suplhide-, sodium- and chlorine chemicals for reasons of chemical balance.

The main characteristics of the invention are disclosed in the enclosed claims.

In the process according to the present invention fibrous pulp material is cooked with a cooking liquor and the formed pulp is separated, the pulp is washed with the spent liquor deriving from the bleaching and is bleached with chlorine dioxide and possibly with one or several chlorine-free bleaching chemicals, as $O_2$, whereby the bleached pulp is formed.

In accordance with the invention, the solutions obtained from the cooking and washing are combined and concentrated by evaporation and the secondary product deriving from the preparation of chlorine dioxide is combined with the concentrated spent liquor. Subsequently the obtained spent liquor is burned in order to form a melt and flue gases.

The melt obtained by burning the spent liquor is dissolved in order to form a concentrated high sulphide, high chloride green liquor. A fraction of this green liquor is causticized in the first causticizer with the CaO obtained by burning lime mud and the white liquor obtained is subsequently conducted to the cooking. The rest of the concentrated green liquor is precarbonized after clarification by flue gases, which derive from the burning of the spent liquor. The following reaction then takes place $$2 Na_2S + H_2 + CO_2 \rightarrow NaHS + Na_2CO_3$$

The obtained precarbonated green liquor is treated with a solution containing $NaHCO_3$ and hydrogen suplhide is stripped from the solution. The following reaction then takes place $$NaHS + NaHCO_3 \rightarrow Na_2CO_3 + H_2S$$

The $NaHCO_3$ required for the reaction is prepared by treating the sodium solution obtained by separation of hydrogen sulphide by means of cooled flue gases according to the following reaction $$Na_2CO_3 + CO_2 + H_2O \rightarrow 2 NaHCO_3$$

According to the invention aqueous vapour is separated by condensation from the separated hydrogen sulphide and the $H_2S$ gas obtained is burned into $SO_2$. The $SO_2$ gas is cooled and a fraction is conducted to the preparation of $H_2SO_2$. The $H_2SO_2$ obtained is used for the preparation of $ClO_2$. The remaining part of the $SO_2$ gas is conducted directly to the preparation of $ClO_2$.

The solution stripped according to the invention is causticized in a second causticizer with the CaO obtained by burning slime mud and subsequently the causticized and stripped solution is evaporation crystallized in order to separate $Na_2CO_3$ and $Na_2SO_2$.

The liquid of crystallization of $Na_2CO_3$ and $Na_2SO_2$ is evaporation crystallized in order to obtain crystalline NaCl. The NaCl crystals are separated and washed if desired, whereby the washing liquor is lead to the causticizing of the stripped liquor. The NaCl crystals obtained are used for preparing a liquid, from which NaClO$_3$ is prepared electrolytically, which is used for the preparation of ClO$_2$.

The liquid of crystallization of the NaCl evaporation crystallization, which mainly contains NaOH, is used for the bleaching of the pulp as the required NaOH and the surplus is advantaneously used to reduce the sulphide and chlorine concentration of the cooking liquor obtained in the first causticizer.

The spent liquor from the bleaching is used for the washing of the pulp obtained in the cookinq of the pulp material, whereby a portion of the alkaline spent liquor from the bleaching may be used for reducing the density of the concentrated green liquor and/or cooking liquor passing to the first causticizer.

According to a preferred embodiment of the present invention, the major portion of the solid material contained in the flue gases generated in the burning of the spent liquor is separated from the flue gases, the separated solid material being recycled to the burning of spent liquor. The flue gases having a reduced concentration of solid material are subsequently washed in order to form an acid Cl containing liquor. This liquor is separated and neutralized with the CaCO$_3$ obtained in the causticizing of the stripped liquor. The flue gases having a reduced Cl concentration are subsequently washed with a liquor containing sodium carbonate, which has been prepared from the sodium carbonate separated by evaporation crystallization from the causticized stripped liquor. The SO$_2$ containing liquor obtained in this washing step is returned into the process to be causticized together with the green liquor to be prepared into cooking liquor. The flue gases, of which the Cl and SO$_2$ concentration has been reduced, is used as a CO$_2$ source in the said carbonating and precarbonating reaction.

The flue gases of the said preparation of H$_2$SO$_2$ are advantageously conducted to the preparation of SO$_2$ water and the prepared SO$_2$ water is subsequently used in the bleaching for the acidation of the pulp.

The melt obtained in the burning of the spent liquor may be dissolved e.g. with the aqueous solutions obtained in the evaporation crystallization of the causticized stripped liquor.

According to the process of the invention the melt, which has been obtained by burning the spent liquor deriving from the cooking of the pulp material, the chlorine bleaching liquor and the secondary product obtained in the preparation of chlorine dioxide, are dissolved in order to form a green liquor, which contains plenty of sulphide and chlorine. This green liquor is divided into two flows, of which one is causticized in the first causticizer in order to form white liquor, which is returned to the cooking step. According to the invention, the sulphide contained in the second green liquor flow is separated as hydrogen sulphide, which is further burned into sulphur dioxide, which is used for the preparation of chlorine dioxide and in the bleaching step of the acidation of the pulp. The chloride contained in this second green liquor flow is then separated as sodium chloride, from which sodium chlorate is subsequently electrolytically prepared, which is used for the preparation of chlorine dioxide. Thus the sulphide and chloride contained in this second green liquor flow are transformed into chemicals usable for bleaching. According to the process of the invention, the chemicals contained in the spent liquors of the cooking and the bleaching are regenerated to be recycled as cooking and bleaching chemicals, and owing to the chemical cycle according to the invention there is no need for removing sulphur, sodium and chlorine chemicals for chemical balance reasons.

The chemical losses may be compensated by feeding into the process sodium sulphate, sodium chloride and sulphur as complementary chemicals.

BRIEF DESCRIPTION OF THE FIGURE

The invention is described more in detail below by means of an example with reference to the enclosed figure, which illustrates a process chart for the application of the process according to the invention.

EXAMPLE

Wood chips 1 are cooked 90,9 t/h with the cooking liquor 62, which contains 13560 kg NaOH/h and 5700 kg Na S/H and a total of chemicals of 15112 kg Na/h, 2828 kg S/h and 2780 kg Cl/h.

42.1 t/h pulp material 3 is obtained, from which the spent liquor is separated and the pulp is washed with 2 neutralized spent liquor 4, which derived from the bleaching of the pulp and contains 2510 kg organic /h, 1420 kg Na/h, 96 kg S/h and 592 kg Cl/h. The separated spent liquor 6 containing 50,290 kg organic secondary product 8 obtained from the preparation 7 of chlorine dioxide, said secondary product containing 440 kg Na/h, 380 kg S/h and 88 kg Cl/h.

The spent liquor 9 is burned 10 together with 70,260 kg/h of make up Na$_2$SO$_2$ in order to form the melt and the flue gas 11. The major portion of the solid material contained in the flue gases is separated and the separated solid material is returned to the burning of spent liquor. The flue gases 11 having a reduced concentration of solid material containing 16 kg Na/h, 200 kg S/h and 172 kg Cl/h are washed 12 in order to prepare an acid Cl containing liquid 13, containing 14 kg Na/h, 20 kg S/h and 160 kg Cl/h, and to separate said liquor. The flue gases 14, of which the Cl concentration has been reduced, containing 2 kg Na/h, 180 kg S/h and 12 kg Cl/h are washed 68 in order to prepare a SO$_2$ containing liquor 15 containing 320 kg Na/h, 200 kg S/h and 12 kg Cl/h, by adding to the washing step a sodium carbonate containing liquor 16 containing 320 kg Na/h, 40 kg S/h and 12 kg Cl/h.

The melt obtained in the burning of the spent liquor containing 16,640 kg Na/h, 3084 kg S/h and 3208 kg Cl/h, is dissolved in order to form a concentrated 186 kg Na$_{2O}$/m$^3$, high sulphide, high chloride green liquor 18.

A portion of the green liquor 19 containing 19.1 m$^3$/h, 2634 kg Na/h, 488 kg S/h and 508 kg Cl/h is clarified 20 and the clarified green liquor 21 is treated 22 with flue gases in order to prepare a precarbonated liquor 24 containing 23 2100 m$^3$ n/h NaHS 763 kg/h. The precarbonated green liquor is treated 25 with a liquor 26 containing NaHCO$_2$ 2290 kg/h and from the liquor is stripped hydrogen sulphide 28 463 kg/h with vapour 27, which has been produced by comprimating the vapour obtained in evaporation crystallization 51. The H$_2$S containing vapour 28 is conducted to become heating vapour of the crystallization step 51 and the concentrated H$_2$S is conducted together with the make up sulphur 71 20 kg S/h to be burned 29 to SO$_2$ 30 912 kg/h.

The $SO_2$ gas is cooled 31 and a portion 304 kg $SO_2$/h of the cooled $SO_2$ gas 32 is conducted to the preparation 34 of $H_2SO_2$ 33, of which preparaion the exhaust gases 152 kg $SO_2$/h are conducted to the preparation 37 of the $SO_2$ water 36.

The remaining portion of the $SO_2$ gas 38 608 kg $SO_2$/h is conducted to the preparation 7 of $ClO_2$ 39.

The prepared $H_2SO_4$ 33 233 kg/h is used for the preparation of $ClO_2$ and the $SO_2$ water 36 152 kg $SO_2$/h is used in the bleaching 5 for the acidation of the pulp.

The $NaHCO_2$ 26 required for the separation 25 of hydrogen sulphide is prepared by treating 41 the sodium solution 42 obtained in the separation of the hydrogen sulphide 1800 kg $Na_2CO_3$/h, by flue gases 44 cooled 43 to 45° C. 25,000 mn/h.

The rest of the stripped solution 45 containing 2634 kg Na/h, 52 kg S/h and 508 kg Cl/h, is causticized 46 with the CaO 49 2785 kg CaO/h obtained in the burning 48 of $CaCO_3$ 47.

The causticized stripped solution 50 20.2 $m^3$/h is evaporation crystallized 51 by evaporating water 13.1 t/h, in order to separate 16 $Na_2CO_3$ and $Na_2SO_2$.

The liquid of 52 7.1 $m^3$/h of the $Na_2CO_3$, $Na_2S_4$ crystallization is evaporation crystallized 53 by evaporating water 5.8 t/h, in order to prepare 54 crystalline NaCl e.g. by compressing evaporated aqueous vapour and using the compressed vapour as heating vapour. The NaCl crystals are separated and washed 55 and the washing liquid 56 is conducted to the causticizing 46 of the stripped liquid.

The solution 57 778 kg NaCl/h prepared from the washed NaCl crystals is conducted together with the make up NaCl 72 336 kg NaCl/h to the preparation 58 of $NaClO_3$ and the produced $NaClO_3$ 2028 kg/h is used for the bleaching 5 of the pulp material 40 for the preparation 7 of the required $ClO_2$ n 39 1120 kg/h.

The liquid of crystallization 53 of the NaCl evaporation crystallization containing mainly NaOH is used as the NaOH 60 required for the bleaching 50 of the pulp 40 containing 1456 kg Na/h, 8 kg S/h and 16 kg Cl/has well as the surplus 61 containing 552 kg Na/h, 4 kg S/h and 16 kg Cl/h, is used in order to reduce the sulphide and chlore concentration of the liquid 62 used for the cooking 62. A portion of the alkaline spent liquor 63 of the bleaching containing 232 kg Na/h, 28 kg S/h and 52 kg Cl/h is used to reduce the density of the concentrated green liquor 64 conducted to the causticizing 65 and that of the liquid of crystallization 61 to be used as cooking liquor.

A portion of the $CaCO_3$ 66 154 kg/h obtained from the causticizing of the stripped liquor is used for neutralizing 67 of the HCl discharge liquor 13. In order to reduce the need for $ClO_2$ in the bleaching, oxygen 200 kg/h is used. The bleached pulp 40 40 t/h is used for various purposes.

I claim:

1. A process for cooking and bleaching pulp, whereby the spent liquors from the cooking and the bleaching are recovered and their chemicals are regenerated to be recycled as cooking and bleaching chemicals, comprising the steps of:

A. cooking fibrous pulp material with a cooking liquor to form a cooked pulp and spent cooking liquor and spent cooking liquor, B. separating said cooked pulp from said spent cooking liquor, C. preparing chlorine dioxide and a secondary product containing sodium, sulfur and chlorine, by reacting a portion of $NaClO_3$, a portion of $H_2SO_4$ and a first stream of $SO_2$ gas, D. bleaching said pulp with said chlorine dioxide and a NaOH source to form a bleached pulp, and an alkaline spent bleach liquor, E. separating said bleached pulp, from said alkaline spent bleach liquor, and neutralizing a first portion of said alkaline spent bleach liquor to form a neutralized spent bleach liquor, F. washing said cooked pulp with said neutralized spent bleach liquor, said washing step occurring prior to said step B to form spent washing liquors, G. separating said spent washing liquors from said cooked pulp, H. combining said secondary product with said spent washing liquors, burning the combined secondary product and liquors to form a melt and a stream of flue gases, containing solid material and separating said melt from said stream of flue gases, I. dissolving said melt to form a concentrated, high sulphide, high chloride green liquor, and separating said green liquor into a first portion and a second portion, J. causticizing said first portion of said green liquor to form said cooking liquor which is recycled to said step A for cooking fibrous pulp material, K. clarifying said second portion of green liquor to form a clarified green liquor, L. cooling said stream of flue gases and separating the cooled stream into a first cooled stream and a second cooled stream, M. treating the clarified green liquor with said first cooled stream of flue gases to form a precarbonated green liquor, N. treating said precarbonated green liquor with a $NaHCO_3$ containing solution to form a hydrogen sulphide-containing solution, a first sodium solution and a second sodium solution, O. treating said first sodium solution with said second cooled stream of flue gases to form said $NaHCO_3$-containing solution, which is recycled to stpe N for treating said precarbonated green liquor, P. burning said hydrogen sulphide-containing solution to form a $SO_2$ gas, Q. separating said $SO_2$ into a first stream, which is passed to step C for preparing chlorine dioxide, and a second stream, which is converted to $H_2SO_4$ and exhaust gases, and said $H_2SO_4$ is passed to step C, R. causticizing said second sodium solution with a source of CaO to form $CaCO_3$, S. burning a first portion of said $CaCO_3$ to form CaO, which is recycled to step R as said CaO source, T. evaporation crystallizing said causticized second sodium solution to form $Na_2CO_2$, solids $Na_2SO_4$ solids and a liquor of crystallization containing $Na_2SO_4$, and separating said $Na_2CO_3$ solids and $Na_2SO_4$ solids from said liquor of crystallization, U. evaporation crystallizing a first portion of said liquor of crystallization of containing $Na_2CO_3$ to form NaCl crystals and a liquid containing NaOH, V. separating said liquid containing NaOH into a first portion and a second portion, said first portion of said liquid containing NaOH is recycled to step D as said NaOH source for bleaching said pulp, and said second portion of said liquid containing NaOH is recycled to step J, W. converting the NaCl crystals into $NaClO_3$, which is passed to step C as said portion of $NaClO_3$.

2. A process according to claim 1, wherein the NaCl crystals separated in step W are washed to form washed NaCl crystals, and a washing liquor which is recycled to step R.

3. A process according to claim 1, wherein a second portion of said alkaline spent bleach liquor is recycled to step J.

4. A process according to claim 1, wherein said stream of flue gases containing solid material from the step H is treated to separate solid material therefrom, and said solid material is recycled to said burning in step H.

5. A process according to claim 1, wherein said stream of flue gases, obtained from said step H, is first washed to reduce the Cl concentration, thereby forming an acid Cl-containing solution and washed flue gases, said washed flue gases are washed against with a second portion of said liquor of crystallization containing $Na_2CO_3$ obtained in said step U to obtain twice washed flue gases and an $SO_2$-containing solution, and said $SO_2$-containing solution is passed to step J.

6. A process according to claim 4, wherein said stream of flue gases obtained from said step H is first washed to reduce the Cl concentration, thereby forming an acid Cl-containing solution and washed flue gases, said washed the gases are washed against with a second portion of said liquor of crystallization containing $Na_2CO_3$ obtained in said step U, and said $SO_2$-containing solution is passed to step J.

7. A process according to claim 5, wherein said acid Cl-containing solution is neutralized with a second portion of $CaCO_3$ obtained from the step R.

8. A process according to claim 1, wherein said exhaust gases obtained from step Q are converted to $SO_2$ water, which is passed to step D.

9. A process according to claim 1, wherein supplementary chemicals are added to the process, said chemicals being selected from the group consisting of sodium sulphate, elementary sulphur and sodium chloride.

10. A process according to claim 9, wherein said sodium sulphate is added during said burning in step H, said elementary sulphur is added during said step P, and sodium chloride is reacted with said NaCl crystals obtained in step W to form said $NaClO_3$.

* * * * *